United States Patent
Tuan

(10) Patent No.: US 9,622,611 B2
(45) Date of Patent: Apr. 18, 2017

(54) FOLDABLE ELECTRIC KETTLE

(71) Applicant: Ronald Tuan, Nantou (TW)

(72) Inventor: Ronald Tuan, Nantou (TW)

( * ) Notice: Subject to any disclaimer, the term of this patent is extended or adjusted under 35 U.S.C. 154(b) by 313 days.

(21) Appl. No.: 14/449,189

(22) Filed: Aug. 1, 2014

(65) Prior Publication Data

US 2016/0031596 A1  Feb. 4, 2016

(51) Int. Cl.
*A47J 27/21* (2006.01)

(52) U.S. Cl.
CPC .................. *A47J 27/2105* (2013.01)

(58) Field of Classification Search
CPC .............. A47J 27/2105; A47J 27/21–27/212
See application file for complete search history.

(56) References Cited

U.S. PATENT DOCUMENTS

| 5,908,570 A * | 6/1999 | Deliens | A47J 27/21041 |
| | | | 219/438 |
| 2007/0169629 A1* | 7/2007 | Shao | A47J 27/2105 |
| | | | 99/275 |
| 2011/0290753 A1* | 12/2011 | Tuan | A47G 19/12 |
| | | | 215/43 |

FOREIGN PATENT DOCUMENTS

CN  203252442 U  * 10/2013  ............. A47J 27/21

* cited by examiner

*Primary Examiner* — Tu B Hoang
*Assistant Examiner* — Erin McGrath
(74) *Attorney, Agent, or Firm* — Alan D. Kamrath; Kamrath IP Lawfirm, P.A.

(57) ABSTRACT

A foldable electric kettle has a base, a folding body and a holding mount. The base has a connecting segment and a heating seat. The connecting segment has an engaging protrusion and an engaging surface. The folding body is mounted on and connected to the base and has an engaging segment, a folding segment and a neck. The engaging segment is formed on a bottom of the folding body, is mounted in the connecting segment and has an engaging groove and an engaging strip. The holding mount is an annular metal panel, is mounted in the folding body, is connected securely to the base, and has a clamping face abutting against the upper abutting face of the engaging strip. The abutments between the engaging surface, the abutting faces and the clamping face can mount the folding body securely on the base.

13 Claims, 5 Drawing Sheets

FOLDABLE ELECTRIC KETTLE

BACKGROUND OF THE INVENTION

1. Field of the Invention

The present invention relates to a foldable electric kettle and, more particularly, to a foldable electric kettle that can be folded to reduce a volume of the foldable electric kettle.

2. Description of Related Art

A conventional electric kettle has a base, a body, a neck, a spout and a handle. The body is formed on and protrudes from the base. The neck is formed on the body opposite to the base and has a front side and a rear side. The spout is formed through the front side of the neck. The handle is formed on and protrudes from the rear side of the neck. Then, users can carry the conventional electric kettle by the handle and pour liquid out of the conventional electric kettle from the spout.

The conventional electric kettle can be used to store liquid such as water or drink and can be heated by connecting to a heating device. However, the conventional electric kettle has a fixed structure and cannot be folded to reduce a volume of the conventional electric kettle. Thus, the conventional electric kettle requires a larger space for storage when not in use, and the fixed structure of the conventional electric kettle is inconvenient for carriage.

To overcome the shortcomings, the present invention provides a foldable electric kettle to mitigate or obviate the aforementioned problems.

SUMMARY OF THE INVENTION

The main objective of the present invention is to provide a foldable electric kettle that can be folded to reduce the volume of the foldable electric kettle.

The foldable electric kettle in accordance with the present invention has a base, a folding body and a holding mount. The base has a connecting segment and a heating seat. The connecting segment has an engaging protrusion and an engaging surface. The folding body is mounted on and connected to the base and has an engaging segment, a folding segment and a neck. The engaging segment is formed on a bottom of the folding body, is mounted in the connecting segment, and has an engaging groove and an engaging strip. The holding mount is an annular metal panel, is mounted in the folding body, is connected securely to the base and has a clamping face abutting against the upper abutting face of the engaging strip. The abutments between the engaging surface, the abutting faces and the clamping face can mount the folding body securely on the base.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
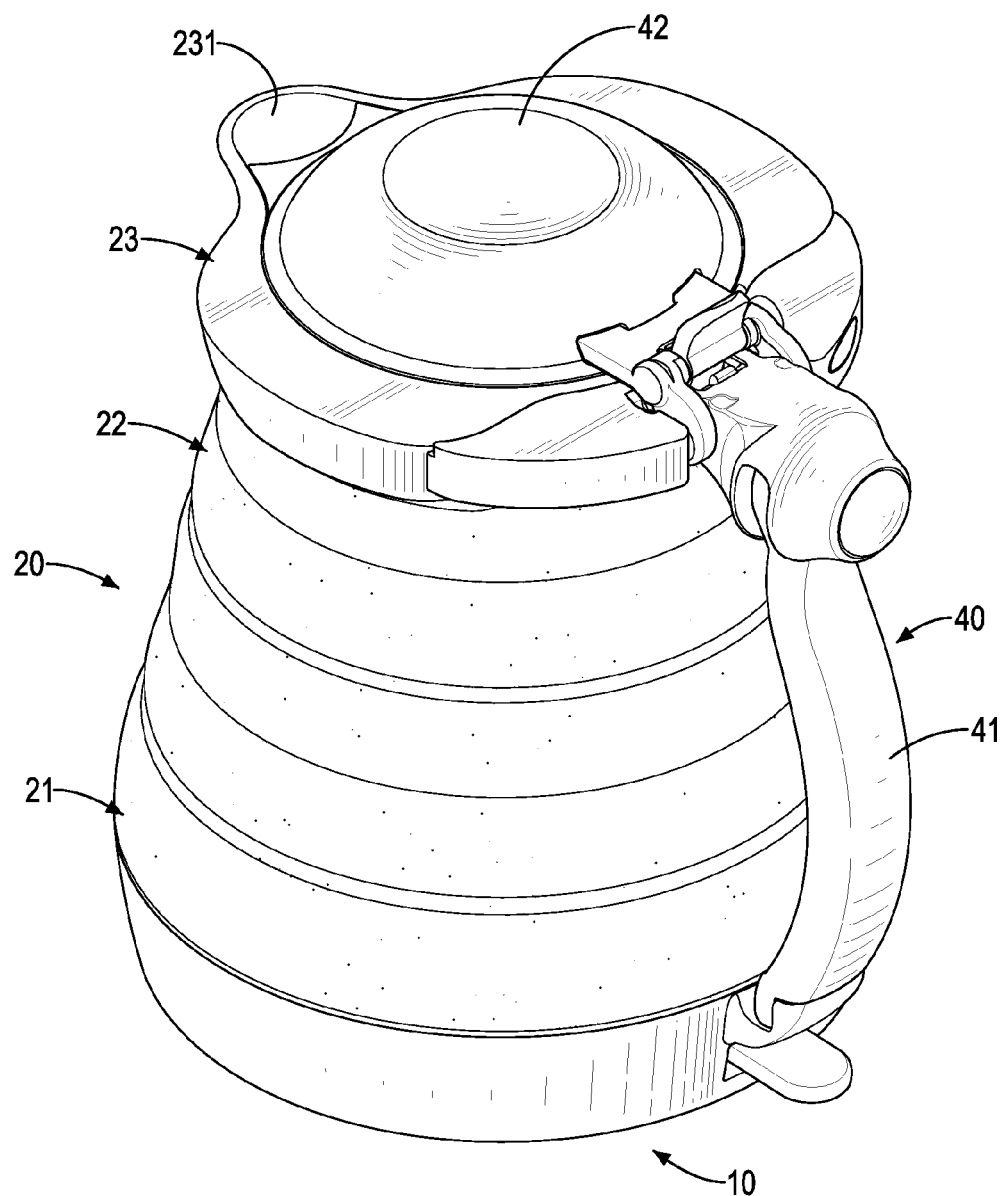
FIG. 1 is a perspective view of a foldable electric kettle in accordance with the present invention.
Figure 2:
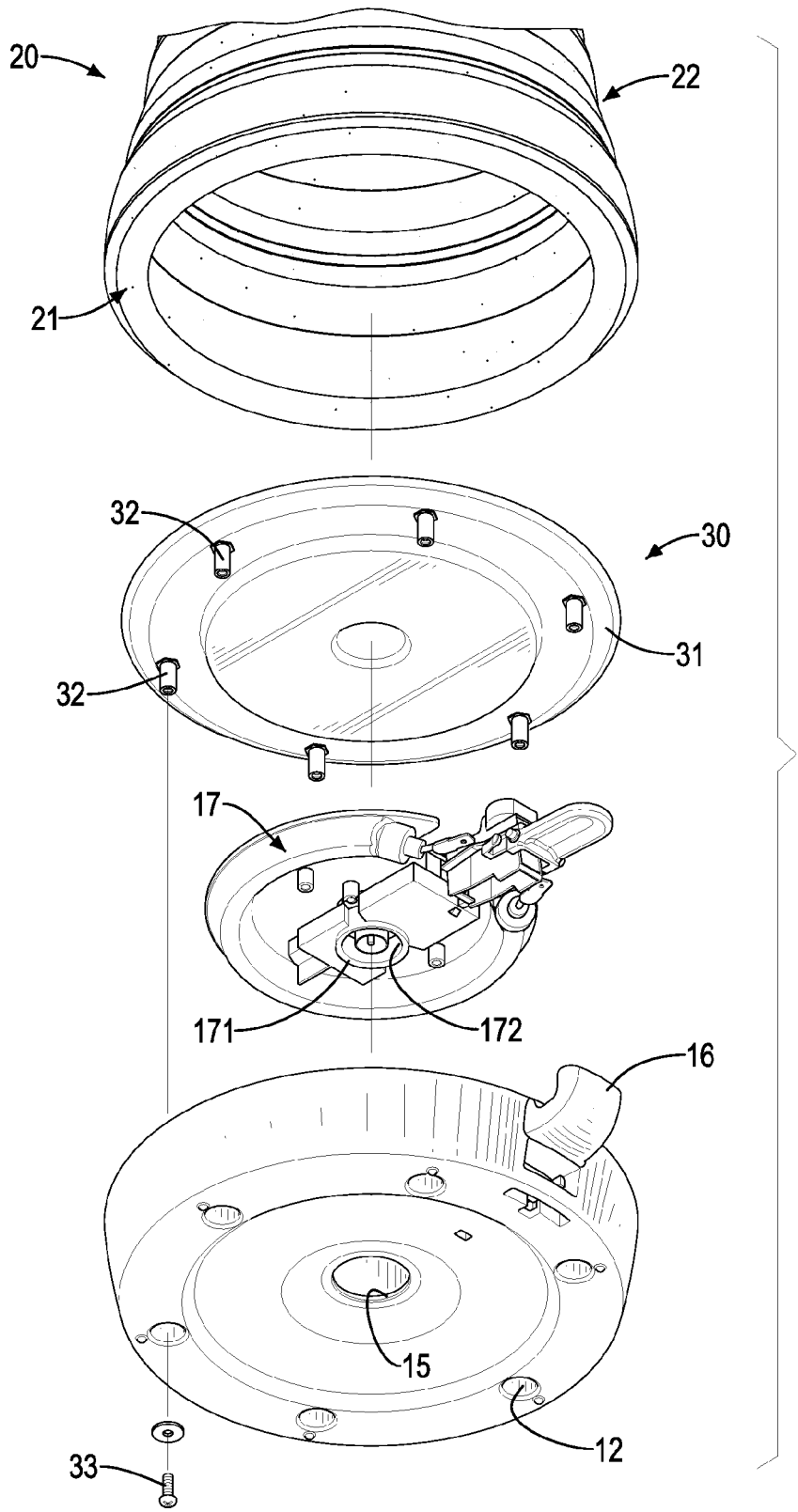
FIG. 2 is an exploded bottom perspective view of the foldable electric kettle in FIG. 1.
Figure 3:
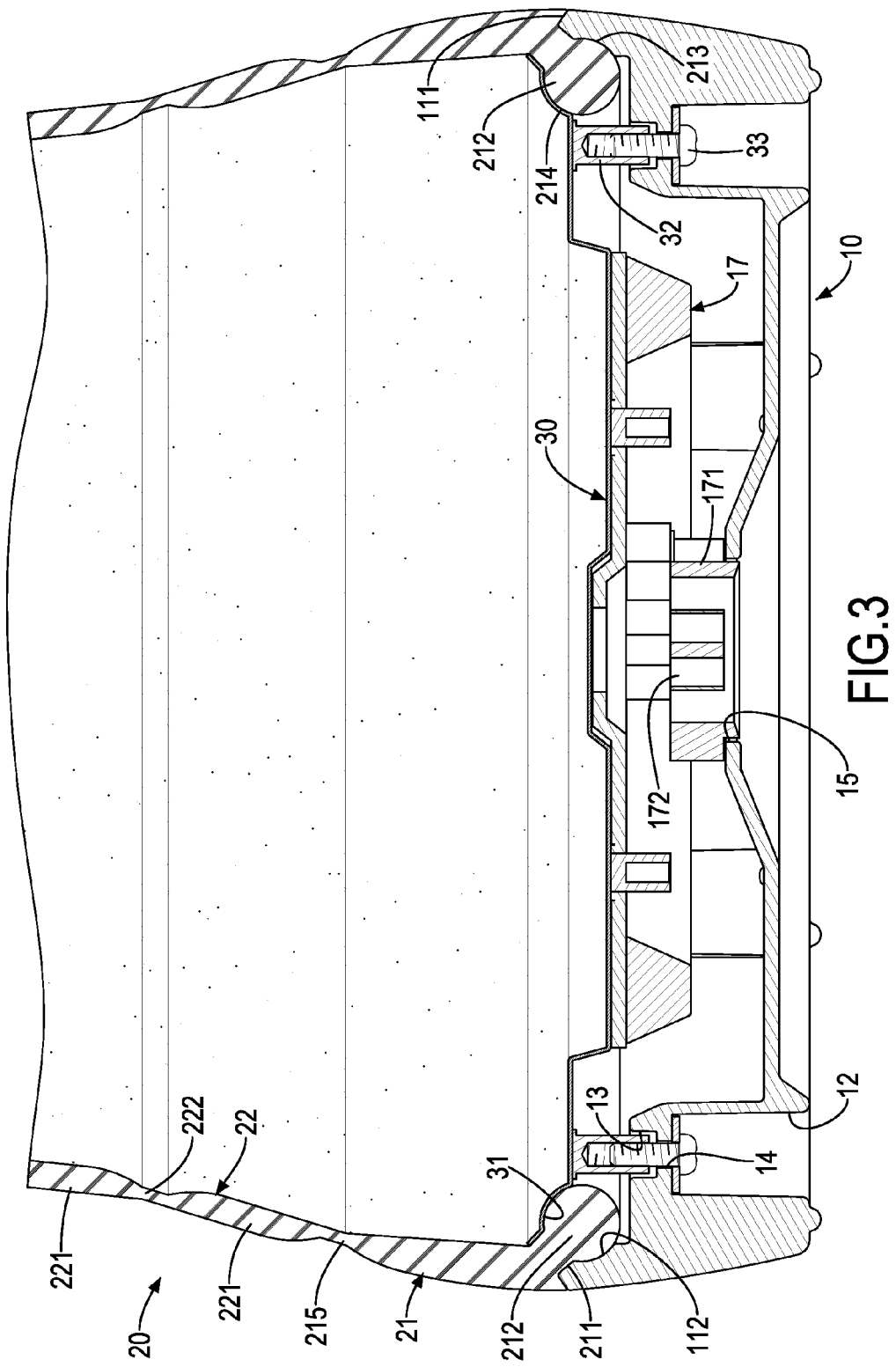
FIG. 3 is an enlarged cross sectional side view in partial section of the foldable electric kettle in FIG. 1.

With reference to FIGS. 1 to 3, a foldable electric kettle in accordance with the present invention has a base 10, a folding body 20, a holding mount 30 and a handle 40.

The base 10 is a metal basin and has an opening top, a closed bottom, an external surface, a center, a connecting segment 11, multiple mounting recesses 12, multiple positioning grooves 13, multiple through holes 14, an assembling opening 15, a holding hook 16 and a heating seat 17.

The connecting segment 11 is annular, is formed around the opening top of the base 10, and has a top side, an inner side, an engaging protrusion 111 and an engaging surface 112. The engaging protrusion 111 is annularly formed on and protrudes from the top side of the connecting segment 11. The engaging surface 112 is curved and is formed on the inner side of the connecting segment 11.

The mounting recesses 12 are formed upwardly in a bottom face of the closed bottom of the base 10 at intervals around the center of the base 10. The positioning grooves 13 are formed in a top face of the closed bottom of the base 10 at intervals and respectively align with the mounting recesses 12. The through holes 14 are formed through the top face and the bottom face of the closed bottom of the base 10 and respectively communicate with the mounting recesses 12 and the positioning grooves 13 to enable the positioning grooves 13 to respectively communicate with the mounting recesses 12. The assembling opening 15 is formed through the top face and the bottom face of the closed bottom of the base 10 at the center of the base 10.

The holding hook 16 is upwardly formed on and protrudes from the external surface of the base 10. The heating seat 17 is mounted in the base 10 via the opening top of the base 10 and has a bottom, a connecting mount 171 and a heating slot 172. The connecting mount 171 is formed on and protrudes from the bottom of the heating seat 17, is connected to the assembling opening 15 of the base 10 and has a bottom face. The heating slot 172 is formed in the bottom face of the connecting mount 171 and communicates with the assembling opening 15 of the base 10. In addition, the heating seat 17 is conventional, and the features and the structures of the heating seat 17 are not described in detail.

The folding body 20 is made of an elastomer, such as silica gel, as a single piece, is mounted on and connected to the base 10, and has an interior, a bottom, a top, an engaging segment 21, a folding segment 22 and a neck 23. The interior of the folding body 20 communicates with the opening top of the base 10.

The engaging segment 21 is annular, is annularly formed on the bottom of the folding body 20, and is mounted in the connecting segment 11 of the base 10. The engaging segment 21 has a bottom face, a top face, an external surface, an internal surface, an engaging groove 211, an engaging strip 212 and a linking section 215. The engaging groove 211 is annularly formed in the bottom face of the engaging segment 21 adjacent to the external surface of the engaging segment 21 and is disposed around the engaging protrusion 111 of the connecting segment 11 of the base 10.

The engaging strip 212 is circular in cross section, is annularly formed on and obliquely protrudes from the internal surface of the engaging segment 21, and is mounted on and abuts the engaging surface 112 of the connecting segment 11 of the base 10. The engaging strip 212 has a bottom, a top, a lower abutting face 213 and an upper abutting face 214. The lower abutting face 213 is curved and is annularly formed on the bottom of the engaging strip 212 and abuts against the engaging surface 112 of the connecting segment 11 of the base 10. The upper abutting face 214 is curved and is annularly formed on the top of the engaging strip 212. The linking section 215 is annularly formed on the top face of the engaging segment 21 and has a thickness smaller than a thickness of the engaging segment 21.

The folding segment 22 is formed on and protrudes from the linking section 215 of the engaging segment 21 and has a top, multiple folding rings 221 and multiple forming sections 222. The folding rings 221 are continuously formed on the linking section 215 of the engaging segment 21 and are formed with each other, and each folding ring 221 has a bottom, a top and a thickness. The bottom of each folding ring 221 has a diameter, and the bottom of the lowermost folding ring 221 is formed on the linking section 215 of the engaging segment 21. The top of each folding ring 221 has a diameter smaller than the diameter of the bottom of the folding ring 221. The thickness of each one of the folding rings 221 is defined as a distance between the bottom and the top of the folding ring 221. The forming sections 222 are formed on the folding segment 22 between the folding rings 221, and each forming section 222 has a thickness. The thickness of each one of the forming sections 222 is defined as a distance between two adjacent folding rings 221 and is smaller than the thickness of each one of the folding rings 221.

The neck 23 is formed on the top of the folding segment 22 and has a spout 231 formed through the neck 23 and communicating with the interior of the folding body 20.

The holding mount 30 is an annular metal panel, is mounted in the folding body 20, and is connected securely to the base 10. The holding mount 30 has a bottom surface, an outer periphery, a clamping face 31, multiple fixing tubes 32 and multiple fasteners 33. The bottom surface of the holding mount 30 abuts the heating seat 17 of the base 10. The clamping face 31 is curved, is formed on the bottom surface of the holding mount 30 along the outer periphery of the holding mount 30, and abuts against the upper abutting face 214 of the engaging strip 212 of the folding body 20. The fixing tubes 32 are formed on and protrude downwardly from the bottom surface of the holding mount 30 at intervals and are respectively mounted in the positioning grooves 13 of the base 10. The fasteners 33 are respectively mounted in the mounting recesses 12 and are securely connected to the fixing tubes 32 via the through holes 14 of the base 10. By the connection between the fixing tubes 32 and the fasteners 33, the holding mount 30 is securely connected to the base 10 to enable the heating seat 17 to be securely held between the base 10 and the holding mount 30. In addition, when the holding mount 30 is securely connected to the base, the abutments between the engaging surface 112 of the connecting segment 11, the lower and upper abutting faces 213, 214 of the engaging strip 212 and the clamping face 31 of the holding mount 30 can mount the folding body 20 securely on the base 10.

The handle 40 is detachably connected to the folding body 20 and the base 10 and has a grip 41 and a lid 42. The grip 41 is rotatably connected between the folding body 20 and the base 10 and has an upper end and a lower end. The upper end of the grip 41 is rotatably connected to the neck 23 of the folding body 20. The lower end of the grip 41 engages the holding hook 16 of the base 10. The lid 42 is connected to the grip 41 and is mounted on the neck 23 of the folding body 20.

In assembly, with reference to FIGS. 2 and 3, the holding mount 30 is tilted to be mounted in the folding body 20 via the bottom of the folding body 20. The holding mount 30 can be adjusted to a horizontal condition relative to the folding body 20, because the folding body 20 is made of silica gel. Then, the clamping face 31 of the holding mount 30 abuts the upper abutting face 214 of the engaging strip 212. After the clamping face 31 abuts the upper abutting face 214, the base 10 is connected to the bottom of the folding body 20 to enable the engaging protrusion 111 of the connecting segment 11 to be mounted in the engaging groove 211 of the engaging segment 21 and to enable the engaging surface 112 of the connecting segment 11 to abut the lower abutting face 213 of the engaging strip 212.

Furthermore, when the base 10 is connected to the folding body 20, the fixing tubes 32 of the holding mount 30 are respectively mounted in the positioning grooves 13 of the base 10. Then, the fasteners 33 are respectively mounted in the mounting recesses 12 and are respectively connected to the fixing tubes 32 via the through holes 14 to connect the holding mount 30 securely to the base 10. Since the holding mount 30 is connected securely to the base 10 by the fasteners 33, the folding body 20 is held securely to be mounted on the base 10 by the abutments between the engaging surface 112 of the connecting segment 11, and the lower and upper abutting faces 213, 214 of the engaging strip 212 and the clamping face 31 of the holding mount 30 can enable the folding body 20 to be securely mounted on the base 10. After the folding body 20 is securely mounted on the base 10 by the fasteners 33, the grip 41 of the handle 40 is connected to the neck 23 of the folding body 20 and engages the holding hook 16 of the base 10 to enable the lid 42 to be mounted on the neck 23 of the folding body 20, and the assembly of the foldable electric kettle in accordance with the present invention is completed.

Figure 4:
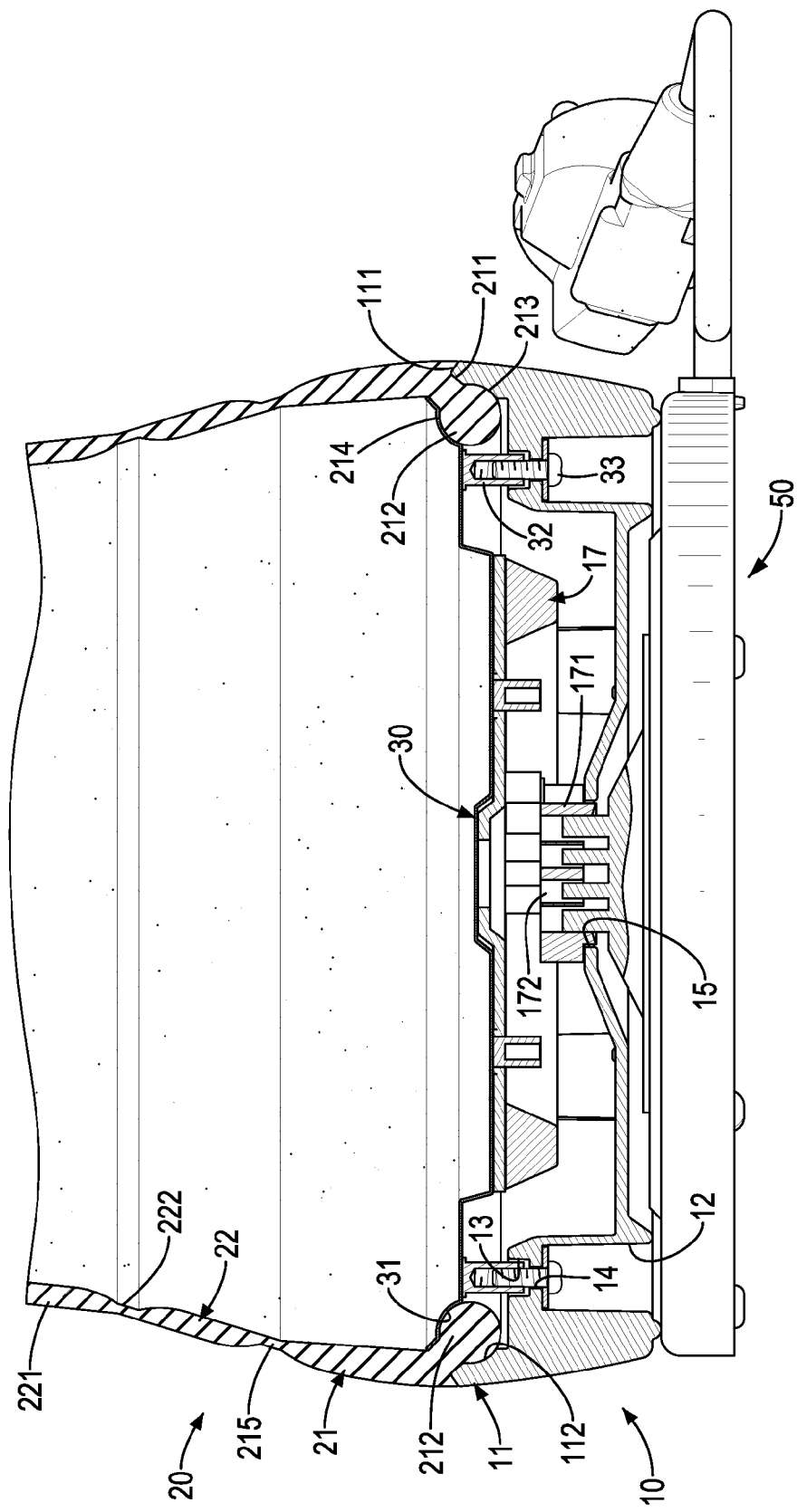
FIG. 4 is an enlarged operational side view of the foldable electric kettle in FIG. 3, connected to a heating socket.
Figure 5:
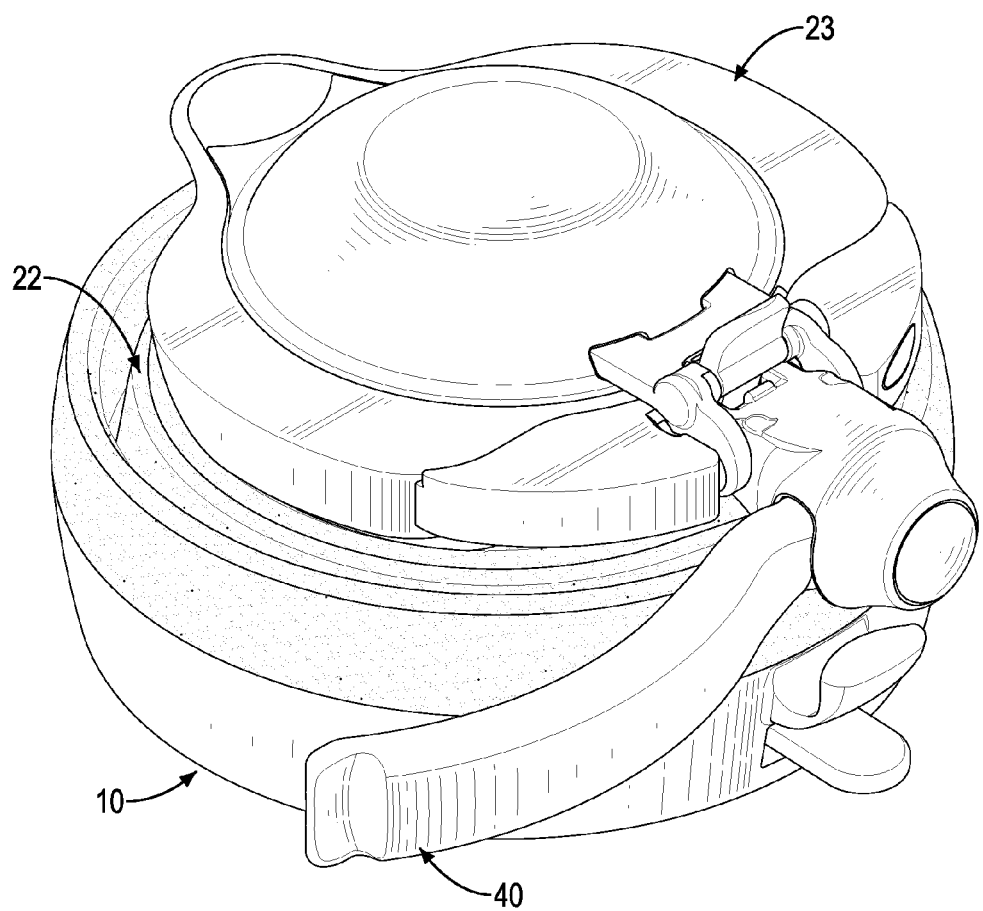
FIG. 5 is an operational perspective view of the foldable electric kettle in FIG. 1, shown in a folded condition.

In use, with reference to FIG. 4, when the foldable electric kettle in accordance with the present invention is used to store liquid, the interior between the base 10 and the folding body 20 can be used to store liquid, and the metal base 10 can be set on a heating socket 50 to heat the liquid in the folding body 20 of the foldable electric kettle via the holding mount 30 by connecting the heating slot 172 of the heating seat 17 to the heating socket 50. With reference to FIGS. 1 and 5, when the foldable electric kettle needs to be folded for transport and carriage, the user can rotate the handle 40 relative to the folding body 20 to enable the grip 41 to disengage from the holding hook 16 of the base 10 and can press the neck 23 downward to fold the folding rings 221 of the folding segment 22. Then, the folding rings 221 and the neck 23 can be folded in the base 10 to reduce the volume of the foldable electric kettle. This is convenient for carriage and storage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A foldable electric kettle comprising:
    a base being a metal basin, with the base having:
        an opening top;
        a closed bottom;
        an external surface;

a center;
a connecting segment being annular and formed around the opening top of the base, with the connecting segment having:
a top side;
an inner side;
an engaging protrusion annularly formed on and protruding from the top side of the connecting segment; and
an engaging surface being curved and formed on the inner side of the connecting segment; and
a heating seat mounted in the base via the opening top of the base;
a folding body made of elastomer and mounted on and connected to the base, with the folding body having:
an interior communicating with the opening top of the base;
a bottom;
a top;
an engaging segment being annular, annularly formed on the bottom of the folding body and mounted in the connecting segment of the base, with the engaging segment having:
a bottom face;
a top face;
an external surface;
an internal surface;
an engaging groove annularly formed in the bottom face of the engaging segment adjacent to the external surface of the engaging segment and disposed around the engaging protrusion of the connecting segment of the base; and
an engaging strip being circular in cross section, annularly formed on and obliquely protruding from the internal surface of the engaging segment to extend into the interior of the folding body and mounted on and abutting the engaging surface of the connecting segment of the base, with the engaging strip having:
a bottom;
a top;
a lower abutting face being curved and annularly formed on the bottom of the engaging strip and abutting against the engaging surface of the connecting segment of the base; and
an upper abutting face being curved and annularly formed on the top of the engaging strip;
a folding segment formed on and protruding from the engaging segment, with the folding segment having:
a top; and
multiple folding rings continuously formed on the engaging segment and formed with each other; and
a neck formed on the top of the folding segment and having a spout formed through the neck and communicating with the interior of the folding body; and
a holding mount being an annular metal panel, mounted in the folding body and connected securely to the base, with the holding mount having:
a bottom surface abutting the heating seat of the base;
an outer periphery; and
a clamping face being curved, formed on the bottom surface of the holding mount along the outer periphery of the holding mount and abutting against the upper abutting face of the engaging strip of the folding body to hold the engaging strip securely between the engaging surface of the engaging segment and the clamping face of the holding mount.

2. The foldable electric kettle as claimed in claim 1, wherein the base has:
multiple mounting recesses formed upwardly in a bottom face of the closed bottom of the base at intervals around the center of the base;
multiple positioning grooves formed in a top face of the closed bottom of the base at intervals and respectively aligning with the mounting recesses; and
multiple through holes formed through the top face and the bottom face of the closed bottom of the base and respectively communicating with the mounting recesses and the positioning grooves to enable the positioning grooves to respectively communicate with the mounting recesses; and
wherein the holding mount has:
multiple fixing tubes formed on and protruding downwardly from the bottom surface of the holding mount at intervals and respectively mounted in the positioning grooves of the base; and
multiple fasteners respectively mounted in the mounting recesses and securely connected to the fixing tubes via the through holes of the base.

3. The foldable electric kettle as claimed in claim 2, wherein the base has an assembling opening formed through the top face and the bottom face of the closed bottom of the base at the center of the base; and
wherein the heating seat has:
a bottom;
a connecting mount formed on and protruding from the bottom of the heating seat, connected to the assembling opening of the base, and having a bottom face; and
a heating slot formed in the bottom face of the connecting mount and communicating with the assembling opening of the base.

4. The foldable electric kettle as claimed in claim 1, wherein the base has an assembling opening formed through a top face and a bottom face of the closed bottom of the base at the center of the base; and
wherein the heating seat has:
a bottom;
a connecting mount formed on and protruding from the bottom of the heating seat, connected to the assembling opening of the base, and having a bottom face; and
a heating slot formed in the bottom face of the connecting mount and communicating with the assembling opening of the base.

5. The foldable electric kettle as claimed in claim 3, wherein the engaging segment has a linking section annularly formed on the top face of the engaging segment and having a thickness smaller than a thickness of the engaging segment;
wherein each one of the multiple folding rings has:
a bottom having a diameter, with the bottom of a lowermost folding ring formed on the linking section of the engaging segment;
a top having a diameter smaller than the diameter of the bottom of the folding ring; and
a thickness defined as a distance between the bottom and the top of the folding ring; and
wherein the folding segment has multiple forming sections formed on the folding segment between the multiple folding rings, wherein each forming section has a thickness defined as a distance between two adjacent folding rings and being smaller than the thickness of each one of the multiple folding rings.

6. The foldable electric kettle as claimed in claim 4, wherein the engaging segment has a linking section annularly formed on the top face of the engaging segment and having a thickness smaller than a thickness of the engaging segment;
   wherein each one of the multiple folding rings has:
      a bottom having a diameter, with the bottom of a lowermost folding ring formed on the linking section of the engaging segment;
      a top having a diameter smaller than the diameter of the bottom of the folding ring; and
      a thickness defined as a distance between the bottom and the top of the folding ring; and
   wherein the folding segment has multiple forming sections formed on the folding segment between the multiple folding rings, wherein each forming section has a thickness defined as a distance between two adjacent folding rings and being smaller than the thickness of each one of the multiple folding rings.

7. The foldable electric kettle as claimed in claim 5, wherein the base has a holding hook upwardly formed on and protruding from the external surface of the base; and
   wherein the foldable electric kettle further comprises a handle detachably connected to the folding body, with the handle having:
      a grip rotatably connected between the folding body and the base, with the grip having:
         an upper end rotatably connected to the neck of the folding body about an axis extending radially relative to the top of the folding body; and
         a lower end engaging the holding hook of the base; and
      a lid connected to the grip and mounted on the neck of the folding body.

8. The foldable electric kettle as claimed in claim 6, wherein the base has a holding hook upwardly formed on and protruding from the external surface of the base; and
   wherein the foldable electric kettle further comprises a handle detachably connected to the folding body, with the handle having:
      a grip rotatably connected between the folding body and the base, with the grip having:
         an upper end rotatably connected to the neck of the folding body about an axis extending radially relative to the top of the folding body; and
         a lower end engaging the holding hook of the base; and
      a lid connected to the grip and mounted on the neck of the folding body.

9. The foldable electric kettle as claimed in claim 1, wherein the engaging segment has a linking section annularly formed on the top face of the engaging segment and having a thickness smaller than a thickness of the engaging segment;
   wherein each one of the multiple folding rings has:
      a bottom having a diameter, with the bottom of a lowermost folding ring formed on the linking section of the engaging segment;
      a top having a diameter smaller than the diameter of the bottom of the folding ring; and
      a thickness defined as a distance between the bottom and the top of the folding ring; and
   wherein the folding segment has multiple forming sections formed on the folding segment between the multiple folding rings, wherein each forming section has a thickness defined as a distance between two adjacent folding rings and being smaller than the thickness of each one of the multiple folding rings.

10. The foldable electric kettle as claimed in claim 2, wherein the engaging segment has a linking section annularly formed on the top face of the engaging segment and having a thickness smaller than a thickness of the engaging segment;
    wherein each one of the multiple folding rings has:
       a bottom having a diameter, with the bottom of a lowermost folding ring formed on the linking section of the engaging segment;
       a top having a diameter smaller than the diameter of the bottom of the folding ring; and
       a thickness defined as a distance between the bottom and the top of the folding ring; and
    wherein the folding segment has multiple forming sections formed on the folding segment between the multiple folding rings, wherein each forming section has a thickness defined as a distance between two adjacent folding rings and being smaller than the thickness of each one of the multiple folding rings.

11. The foldable electric kettle as claimed in claim 1, wherein the base has a holding hook upwardly formed on and protruding from the external surface of the base; and
    wherein the foldable electric kettle further comprises a handle detachably connected to the folding body and the base, with the handle having:
       a grip rotatably connected between the folding body and the base, with the grip having:
          an upper end rotatably connected to the neck of the folding body about an axis extending radially relative to the top of the folding body; and
          a lower end engaging the holding hook of the base; and
       a lid connected to the grip and mounted on the neck of the folding body.

12. The foldable electric kettle as claimed in claim 2, wherein the base has a holding hook upwardly formed on and protruding from the external surface of the base; and
    wherein the foldable electric kettle further comprises a handle detachably connected to the folding body and the base, with the handle having:
       a grip rotatably connected between the folding body and the base, with the grip having:
          an upper end rotatably connected to the neck of the folding body about an axis extending radially relative to the top of the folding body; and
          a lower end engaging the holding hook of the base; and
       a lid connected to the grip, and mounted on the neck of the folding body.

13. The foldable electric kettle as claimed in claim 3, wherein the base has a holding hook upwardly formed on and protruding from the external surface of the base; and
    wherein the foldable electric kettle further comprises a handle detachably connected to the folding body and the base, with the handle having:
       a grip rotatably connected between the folding body and the base, with the grip having:
          an upper end rotatably connected to the neck of the folding body about an axis extending radially relative to the top of the folding body; and
          a lower end engaging the holding hook of the base; and a lid connected to the grip and mounted on the neck of the folding body.

* * * * *